April 1, 1958     J. FAGOT     2,828,910
ELECTRONIC PULSE-COUNTING SYSTEM
Filed Dec. 20, 1952     4 Sheets-Sheet 1
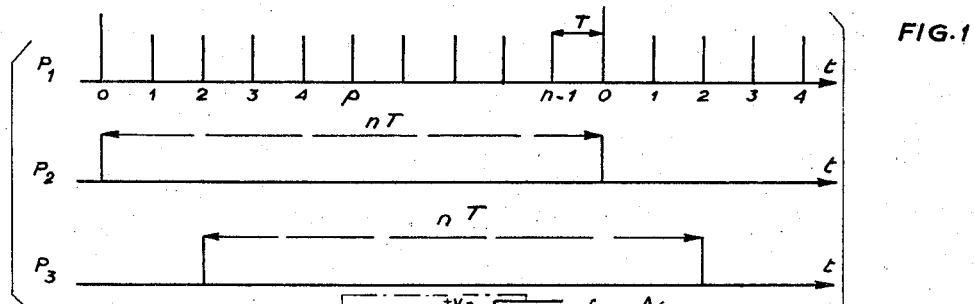
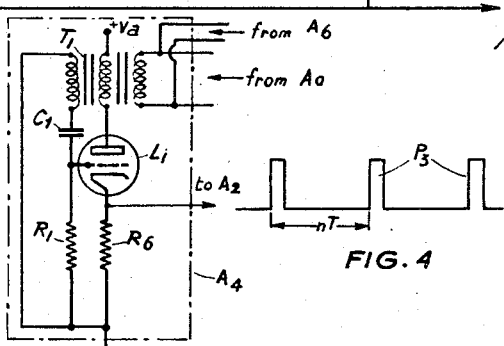
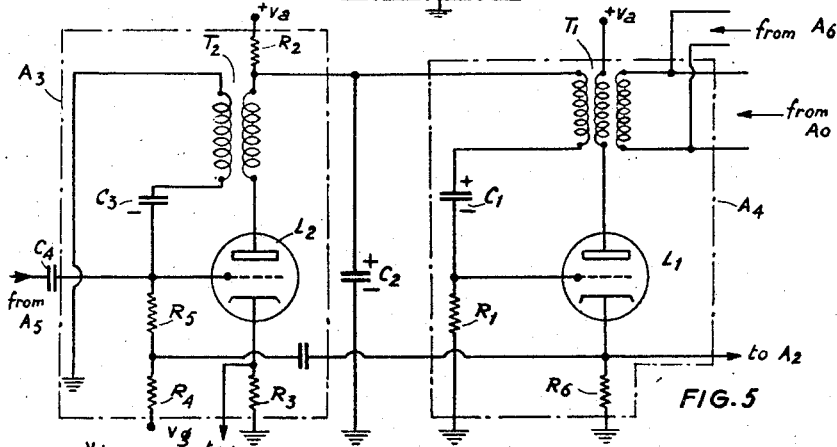
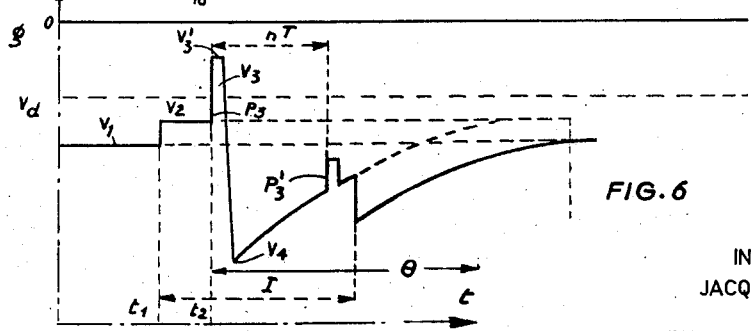
INVENTOR:
JACQUES FAGOT
BY *Karl F. Ross*
AGENT

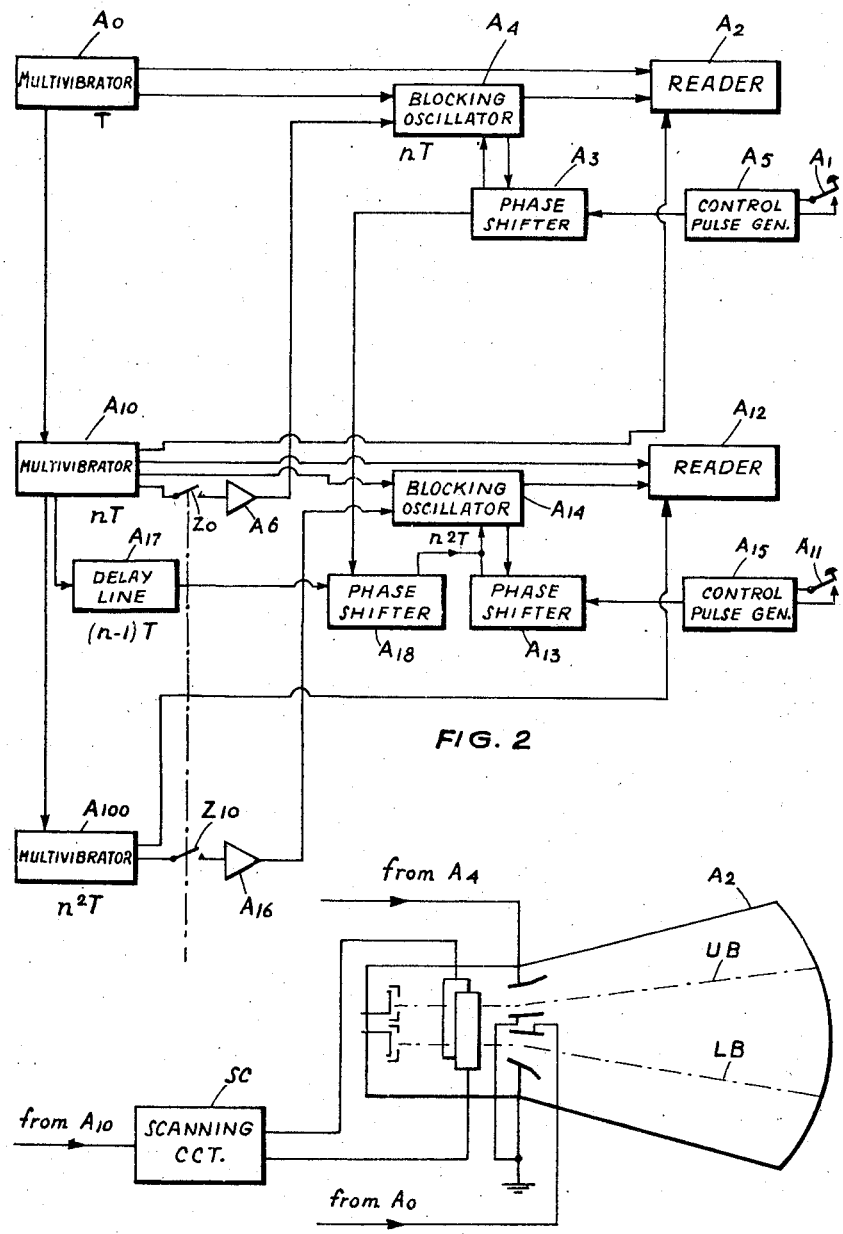

April 1, 1958  J. FAGOT  2,828,910
ELECTRONIC PULSE-COUNTING SYSTEM
Filed Dec. 20, 1952  4 Sheets-Sheet 3

INVENTOR:
JACQUES FAGOT
BY
AGENT

April 1, 1958  J. FAGOT  2,828,910
ELECTRONIC PULSE-COUNTING SYSTEM
Filed Dec. 20, 1952  4 Sheets-Sheet 4

INVENTOR:
JACQUES FAGOT
BY Karl F. Ross
AGENT

United States Patent Office 2,828,910
Patented Apr. 1, 1958

2,828,910

ELECTRONIC PULSE-COUNTING SYSTEM

Jacques Fagot, Paris, France, assignor to Compagnie Generale de Telegraphie Sans Fil, Paris, France, a corporation of France Application December 20, 1952, Serial No. 327,130

Claims priority, application France December 27, 1951

18 Claims. (Cl. 235—61)

My present invention relates to memory system designed to store, temporarily or for an indefinite period, numerical values or other magnitudes to be used in computers, selectors or the like.

Known systems of this type utilize electromagnetic or electronic relays (e. g. so-called memory tubes) which are ordinarily capable of operating only in the "yes-no" or binary fashion and which, therefore, must be provided in relatively great numbers to enable solution of more complex mathematical problems. In certain instances, e. g. for the transfer of a decimal carry, use is made of special circuits such as, for example, supersonic delay lines which are costly, individually constructed pieces of equipment and which, furthermore, can store information for a limited period only.

An object of the present invention is, therefore, to provide means for storing a relatively large amount of information with the aid of simple and inexpensive equipment and for an indefinite length of time.

Another object of this invention is to provide a circuit arrangement including a small number of electronic devices yet adapted for the indefinite storage of a selected magnitude or numerical value among a large plurality of distinct magnitudes or numerical values.

Further, more specific objects of the invention are to provide, in a system adapted for the storage of numerical values, simple means for (a) zeroizing the system, (b) increasing (or decreasing) the value of a stored digit for the purpose of addition (or subtraction), (c) maintaining the system indefinitely locked to register a selected digit or combination of digits, (d) enabling a convenient reading of the values registered, and (e) facilitating the transfer of a carry from a lower denominational order to a higher one.

It is also an object of my invention to provide a novel electronic selector for communication systems including a simple digit-storing circuit of the character referred to above.

A still further object of this invention is to provide means for realizing some or all of the foregoing objects with the aid of inexpensive, conventional vacuum tubes, such as ordinary triodes.

In accordance with my present invention there is provided a memory system comprising a first pulse generator producing a train of uniformly spaced pulses, a second pulse generator producing a train of similar pulses having a cadence, or frequency of occurrence, which is an exact submultiple of that of the first train, and means for locking the second pulse generator in step with selected pulses of the train produced by the first generator, the relative phase of the two pulse trains denoting a particular numerical value or other magnitude.

A system as described above, comprising a pair of pulse generators with harmonically related outputs, may constitute one of several digital stages of a numerical storage device wherein the lowest denominational order is represented by a first pulse generator of fixed phase and period of recurrence T in combination with a second pulse generator of variable phase and period $nT$, the next denominational order being represented by a third pulse generator of fixed phase and period $nT$ in combination with a fourth pulse generator of variable phase and period $n^2T$, and so on, the factor $n$ representing the base of the numerical system and being 10 in the case of a decimal system. Thus the output of the first generator may be a train of pulses whose duration is of the order of a microsecond and whose spacing is of the order of a millisecond; the output of the second and of the third generator will then consist of similar pulses with a spacing of the order of ten milliseconds, and the pulses produced by the fourth generator will have a spacing of about one tenth of a second. The fixed-phase or reference pulse generators of the successive denominational orders, such as the first and the third generator above referred to, will be rigidly locked in step with one another and will help define groups of $n$ pulses in the output of each lower-order reference pulse generator, the digital value $p$ ($p<n$) registered by each stake being determined by the coincidence of each pulse from the variable-phase counting-pulse generator (e. g. the second generator) with the No. $p$ pulse in each group of $n$ pulses produced by the associated fixed-phase reference pulse generator (e. g. the first generator).

According to another feature of the invention, means may be provided for momentarily increasing (or decreasing) the period of the variable-phase pulse generator in such manner as to shift its phase from coincidence with the No. $p$ pulse of an $n$-pulse group to coincidence with the No. $p+1$ (or No. $p-1$) pulse thereof, whereby the value registered by the system may be augmented (or diminished) by increments of one in response to an appropriate input signal; the latter, in turn, may consist of randomly occurring control pulses produced manually, or otherwise, and applied to a phase shifting device associated with the variable-phase generator. There may be further provided, in accordance with still another feature of the invention, means for zeroizing the system (or a particular stage thereof) by effectively enlarging the amplitude of the No. 0 pulse of each group in the output of the reference pulse generator to cause the counting-pulse generator to be locked in on this pulse; since each No. 0 pulse of the reference pulse generator will coincide with a pulse produced by the reference pulse generator of the next higher denominational order, the output of the latter generator may be used for effectively enlarging the amplitude of said No. 0 pulses. Yet a further feature of the invention resides in the provision of means for advancing (or retarding) the phase of the counting-pulse generator of a higher denominational order whenever the value of the digit stored in the next-lower denominational order passes from $n-1$ to $n$ (or vice versa), a phase position representing the value $n$ being, of course, indistinguishable from one representing zero within a given denominational order.

The fixed-phase or reference pulse generators in a system according to my invention may, in a particular embodiment, be multivibrators of high frequency stability, preferably of the quartz-controlled type. The variable-phase or counting-pulse generators may be relaxation oscillators, e. g. of the type known as blocking oscillators comprising triodes with plate-grid feedback and high grid resistances. The blocking oscillator of each stage will have a recovery period which is $n$ times the period of the associated multivibrator to which it is locked so as to produce a counting pulse in response to every $n$th reference pulse produced by the multivibrator. A control circuit associated with the blocking oscillator is so connected thereto, in an additive system, as momentarily to increase the oscillator's recovery period in response to an incoming signal pulse whereby the oscillator, having regained its normal recovery period immediately after the next counting pulse, will now be locked in step with a multivibrator pulse following by one pulse interval T the pulses with which its output had been synchronized before. A succession of several signal pulses, applied to the control circuit, will thus advance the phase of the blocking oscillator with respect to the multivibrator by a corresponding number of pulse intervals T. If, however, a given pulse in each group of $n$ successive multivibrator pulses, such as the No. 0 pulse, is greatly enlarged in amplitude above the others, then the blocking oscillator will be triggered by these No. 0 pulses irrespectively of the operation of the control circuit. The blocking oscillator, in accordance with principles well known per se, may have its recovery period determined by a timing circuit of the resistance-capacitance type, the oscillator tube being responsive to synchronizing pulses from the multivibrator only when a condenser in the timing circuit, whose charge is rapidly altered by a discharge of said tube, has been discharged or charged to its normal level; when the associated control circuit operation, it applies a supplemental impulse to the timing circuit so as to lengthen the time required for the condenser to regain its normal charge level.

Each stage of a memory system according to my invention may be provided with a reader which, in a preferred embodiment, comprises a cathode ray tube visually displaying the pulses from the multivibrator and from the blocking oscillator in their proper phase position, thereby enabling ready ascertainment of the value registered.

The invention is specifically applicable to telecommunication systems wherein a plurality of calling stations at one end of a transmission channel are to be placed in selective communication with a plurality of called stations at the other end of the channel. According to this aspect of my invention there is provided at the called end of the channel a source of gating pulses for periodically sampling the signal bands of the called stations in cyclic succession, whereby signal pulses from all of said called stations will be interleaved in a predetermined order; at the calling end of the channel the incoming signal pulses will appear as a pulse train consisting of groups of pulses whose group repetition frequency is equal or harmonically related to the cadence of said gating pulses. A source of gating pulses at each calling station, controlled by phase shifting means of the character previously described, is adapted to fall into step with selected pulses received over the common channel, whereby the incoming and outgoing signal band of a calling station will be sampled in synchronism with that of a selected called station and communication between the two stations becomes possible.

The invention will be better understood from the following description of certain representative embodiments, reference being had to the accompanying drawing in which:

Fig. 1 is a set of graphs illustrating the various pulse trains used in a system according to the invention;

Fig. 2 is an overall block diagram of a multi-digit storing and computing device according to the invention;

Fig. 3 shows the circuit of a blocking oscillator used in a system according to the invention;

Fig. 4 is a graph illustrating the output of the oscillator of Fig. 3;

Fig. 5 shows the blocking oscillator (Fig. 3) in combination with a phase control circuit according to the invention;

Fig. 6 is a graph illustrating the operation of the circuit arrangement of Fig. 5;

Figs. 8A and 8B illustrate details of a cathode ray tube used as a reader in a system according to the invention.

In Fig. 1 there is shown at $P_1$ a train of pulses whose duration may be about one microsecond and whose spacing T may be assumed to be one millisecond. These pulses are arranged in groups of $n$ pulses each, numbered 0, 1, 2, ... $n-1$, the number $n$ in this specific case being equal to 10. The letter $p$ denotes a given time position of a pulse within the group, between 0 and $n-1$ inclusive, thus $p<n$. It will be noted that every tenth pulse, in position 0, is shown to exceed the other pulses in amplitude, such as will be the case when it is desired to zeroize the system.

At $P_2$ there is shown a second train of pulses whose duration is about the same as that of the pulses $P_1$ yet whose spacing is equal to $nT$, or in this particular case equal to ten times the spacing of the pulses $P_1$. Each of the pulses $P_2$ is timed to coincide with a No. 0 pulse of the train $P_1$.

At $P_3$ there is shown a train of pulses similar to the train $P_2$ but phase-displaced with respect thereto in such manner as to coincide with other pulses of train $P_1$, in this particular case with the No. 2 pulses thereof. Thus the pulse trains shown in Fig. 1 represent a registration of the digit "two," as expressed by the phase position of the counting pulses $P_3$ with respect to the reference pulses $P_1$ and $P_2$.

Fig. 2 represents a system for selectively registering a plurality of digits by means of pulse trains such as shown in Fig. 1. In Fig. 2 there is shown a chain of preferably quartz-controlled multivibrators $A_0$, $A_{10}$, $A_{100}$ connected in cascade; multivibrator $A_0$ produces a basic train of reference pulses of period T, such as train $P_1$ of Fig. 1, multivibrator $A_{10}$ produces a higher-order train of reference pulses of period $nT$, such as train $P_2$ of Fig. 1, and multivibrator $A_{100}$ produces a pulse train of still higher order and of period $n^2T$ timed to coincide with every $n$th (i. e. tenth) pulse of train $P_2$.

Figure 8B:
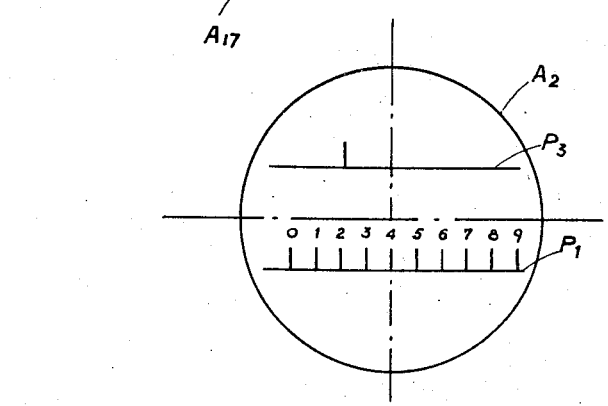

Only two stages of the memory system, associated with the two lowest denominational orders, are completely shown in Fig. 2. The units stage comprises a signaling device $A_1$, here shown as a simple switch, connected to a phase shifter $A_3$ by way of a control pulse generator $A_5$; a blocking oscillator $A_4$, controlled simultaneously from the multivibrator $A_0$ and from the phase shifter $A_3$ in a manner more fully described hereinafter with reference to Fig. 4; and a reader $A_2$, e. g. in the form of a cathode ray tube as shown in Figs. 8A and 8B, connected to the multivibrator $A_0$ and to the blocking oscillator $A_4$. The tens stage, similarly, comprises a signaling device $A_{11}$, a reader $A_{12}$, a phase shifter $A_{13}$, a blocking oscillator $A_{14}$ and a control pulse generator $A_{15}$; this stage additionally includes means for registering a decimal carry from the preceding stage, comprising an auxiliary phase shifter $A_{18}$ connected to the blocking oscillator $A_{14}$ and controlled from the phase shifter $A_3$ and, by way of a delay line $A_{17}$, from multivibrator $A_{10}$. Multivibrator $A_{10}$ is also shown connected to blocking oscillator $A_4$ by way of an amplifier $A_6$ in series with a zeroizing switch $Z_0$, multivibrator $A_{100}$ being similarly connected to blocking oscillator $A_{14}$ by way of an amplifier $A_{16}$ in series with a zeroizing switch $Z_{10}$.

Before discussing in detail the operation of the system of Fig. 2, it may be well to describe more particularly the structure and operation of certain of its elements with reference to succeeding figures. Fig. 3 shows a preferred embodiment of the blocking oscillator $A_4$ (or $A_{14}$), comprising a triode $L_1$ whose plate is connected to high positive potential $+V_a$ through one winding of a three-winding transformer $T_1$; the grid of tube $L_1$ is connected to ground through a resistor $R_1$ and in parallel therewith through a condenser $C_1$ in series with another winding of transformer $T_1$; and the cathode of the tube is connected to ground through a resistor $R_6$. Synchronizing pulses from multivibrator $A_0$ are applied to the tube $L_1$ by way of the third winding of transformer $T_1$. When this happens in the normal condition of the tube, both its grid and its plate are briefly driven more positive and grid current flows, whereby upon cessation of the pulse a high negative potential will appear on the grid terminal of condenser $C_1$ and the tube will remain cut off until enough of the charge on the condenser has been dissipated by way of resistor $R_1$.

The resistance-capacitance network $R_1$, $C_1$ has a time constant such as to make the recovery period of the oscillator $A_4$ equal to or just slightly longer than $nT$ (or ten milliseconds in the specific case assumed), whereby every $n$th pulse from the multivibrator $A_0$ will cause the tube $L_1$ to discharge and to apply a pulse $P_3$ to the reader $A_2$. Yet if the amplitude of certain of the synchronizing pulses impressed upon the transformer $T_1$ is substantially increased, as by supplementing it with a pulse from multivibrator $A_{10}$ over closed switch $Z_0$ and amplifier $A_6$, the oscillator $A_4$ will break down prematurely, if locked in on some different pulse from multivibrator $A_0$, and will fall into step with the enlarged pulses which for convenience will be the No. 0 pulses shown to be of greater amplitude in Fig. 1. It will be understood, however, that such periodic enlargement of a pulse from multivibrator $A_0$ may also be effected by the action of a suitable control circuit (not necessarily the circuit $A_{10}$) directly upon said multivibrator.

Fig. 4 shows the pulses $P_3$ produced by oscillator $A_4$, whose steep flanks are due to the coupling between the left-hand and center windings of transformer $T_1$. The normal period of recurrence of these pulses is $nT$ and their phase displacement with respect to the pulses $P_2$ (produced by multivibrator $A_{10}$) is $pT$, $p$ in this specific instance being any integral number from 0 through 9. If this phase displacement is to be altered under the control of an input signal, then the normal period $nT$ must be momentarily changed to a longer or a shorter one, depending on whether an addition to or a subtraction from the digit already registered is desired. In the instant embodiment this period is momentarily lengthened to $(n+1)T$, or 11T, in response to each control pulse produced by the generator $A_5$ upon actuation of the signaling device $A_1$, by means of the phase shifter $A_3$ whose circuit is shown in Fig. 5.

The right-hand portion of the circuit of Fig. 5 is substantially identical with the circuit of Fig. 3 and represents the relaxation oscillator $A_4$; its timing circuit, however, is here shown to include a further condenser $C_2$, connected in series with condenser $C_1$ between transformer $T_1$ and ground. A second triode $L_2$, forming part of the phase shifter circuit $A_3$ shown on the left in Fig. 5, has its plate connected to high positive potential $+V_a$ through a winding of a transformer $T_2$ in series with a plate resistor $R_2$; the junction of this transformer winding and the resistor $R_2$ is connected to the junction of the condenser $C_2$ and the left-hand winding of transformer $T_1$. The cathode of tube $L_2$ is grounded by way of a resistor $R_3$ from whose ungrounded terminal an output lead extends toward phase shifter $A_{13}$ shown in Figs. 2 and 7; the grid of the tube is connected, via coupling condenser $C_4$, to an input lead from control pulse generator $A_5$ and is further connected to a timing circuit whose parallel branches comprise a condenser $C_3$ grounded through the second winding of transformer $T_2$ and a pair of series resistors $R_4$, $R_5$ connected to negative potential $-V_g$. The junction of the two last-mentioned resistors is connected to the cathode terminal of resistor $R_3$ and also to an output lead extending to the reader $A_2$. Since the timing circuit of oscillator $A_4$ now effectively consists of the elements $R_1$, $R_2$, $C_1$ and $C_2$, all of these elements together must be so dimensioned as to provide the desired time constant discussed in connection with Fig. 3.

The control pulse generator $A_5$, which may be a multivibrator adapted to produce a square positive pulse of fixed duration in response to each single closure of the switch $A_1$, reduces the negative bias normally applied to the grid of tube $L_2$ by the condenser $C_3$ whose lower terminal, in the stable condition of the phase shifter, will be substantially at the potential $-V_g$. This reduction in bias is, however, insufficient to render the tube conductive, as will be apparent from Fig. 6, unless a pulse $P_3$ from the output of oscillator $A_4$ is simultaneously applied to the junction of resistors $R_4$ and $R_5$. In Fig. 6 there is shown at $V_d$ the cutoff voltage of tube $L_2$; at $V_1$ there is shown the normal grid potential of the tube, derived from source $-V_g$, which is so far below the cutoff voltage $V_d$ that neither an incoming control pulse from circuit $A_5$, arriving at a time $t_1$ having a duration indicated at I, nor a counting pulse $P_3$ from oscillator $A_4$ is capable by itself of driving the grid above cutoff. Arrival of the control pulse, however, will raise the grid voltage to a level $V_2$ which is sufficiently close to the cutoff voltage that the next oscillator pulse $P_3$, arriving at a time $t_2$, will drive the grid to a higher-than-cutoff potential $V_3$, causing the tube $L_2$ to discharge. The plate current now flowing in the right-hand winding of transformer $T_2$ will induce in the left-hand winding thereof a voltage of such polarity as to drive the grid still more positive, causing the flow of a large grid current which in turn will further increase the plate current of the tube, thus resulting in a steep voltage pulse rising to the level $V_3'$. With diminishing grid and plate currents the grid is driven sharply negative, as indicated at $V_4$, its potential thereafter returning slowly to the level $V_1$ during an interval of relative insensitivity whose duration $\theta$ is determined by the time constant of the circuit $C_3$, $R_4$, $R_5$. It will be noted that during this interval even the arrival of another counting pulse superimposed upon the control pulse, as shown at $P_3'$, will be incapable of discharging the tube $L_2$.

Since a discharge of tube $L_2$ will always coincide with a discharge of tube $L_1$ (although the converse is not true), the partial discharge of condensers $C_1$ and $C_2$ resulting from a flow of plate current through tube $L_2$ will have the effect of lengthening the recovery period of oscillator $A_4$ initiated by the particular counting pulse involved. It will, however, be apparent that by a suitable change in connections (as by connecting the upper terminal of condenser $C_2$ to cathode resistor $R_3$ instead of plate resistor $R_2$) it will also be possible to produce a shortening of that period, and that, if desired, switchover means may be provided for selectively performing both additions and subtractions. In the particular embodiment described it has been assumed that the lengthening of the recovery period caused by each discharge of the tube $L_2$ is equal to a time $T$, thus advancing the pulse train $P_3$ of Fig. 1 by one interval or step to the right with respect to trains $P_1$ and $P_2$.

It is necessary to make the recovery period $\theta$ of such length, in relation to the width I of a control pulse and the period $nT$ of the counting pulses, that not more than a single counting pulse $P_3$ will be effective in combination with any one control pulse to discharge the tube $L_2$ but that the randomly occurring control pulses will always coincide with one such counting pulse after the circuit $A_3$ has sufficiently recovered for a new discharge. If we assume that the random control pulses are produced by a generator (say, a multivibrator) whose off-cycle or recovery period is $t'$, so that $t'$ will be the minimum spacing between successive control pulses, then it can be readily shown that the above conditions are fulfilled if $\theta$ is made precisely equal to a whole number of periods $(n+1)T$ (the extended recovery period of oscillator $A_4$) and if, furthermore, $(n+1)T \leq I \leq \theta \leq I + t'$; thus in an extreme case, theoretically at least, the pulse interval $t'$ could be reduced to zero and both the pulse width I and the recovery period $\theta$ could be made exactly equal to an integral number of periods $(n+1)T$. If, however, the recovery period $\theta$ deviates from an integral number of periods $(n+1)T$, then the deviations could add up over a succession of control pulses to an apparent lengthening of the recovery period of phase shifter $A_3$ by almost $(n+1)T$, so that for the most general case the formula becomes $(n+1)T \leq I < \theta < I + t' - (n+1)T$, requiring a control pulse interval $t'$ greater than $(n+1)T$.

Figure 7:
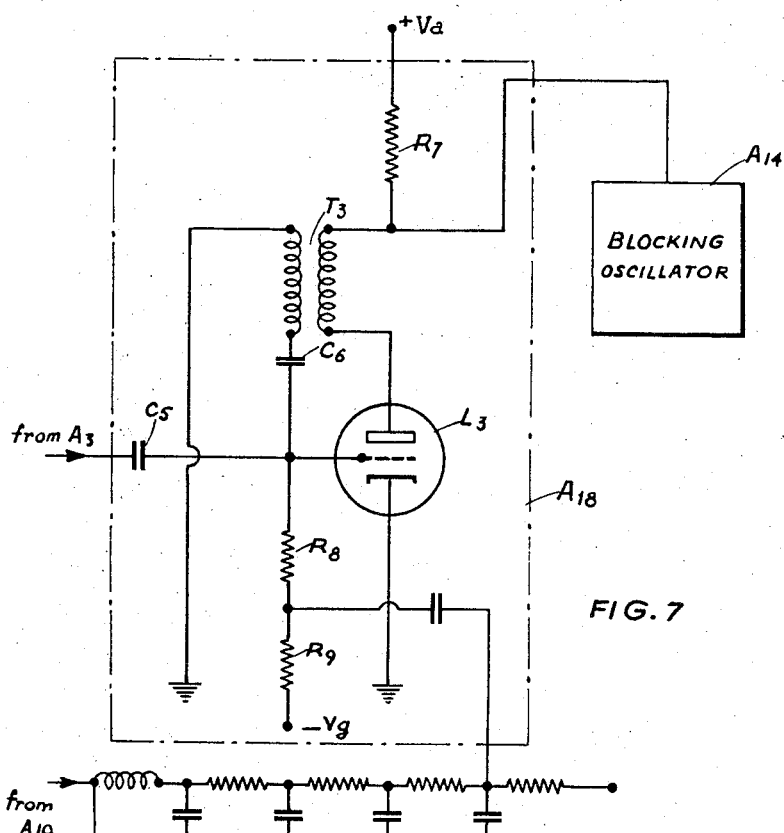
Fig. 7 shows a circuit arrangement for transferring a carry between denominational orders.

Reference is now made to Fig. 7 for explanation of the carry operation of phase shifter $A_{18}$. This phase shifter is generally similar to the phase shifter $A_3$ and comprises a triode $L_3$, a feedback transformer $T_3$ having one winding in series with a plate resistor $R_7$ and another winding in series with a grid condenser $C_6$, and a pair of series resistors $R_8$, $R_9$ connected between the grid and the negative battery $-V_g$. The phase shifter $A_{18}$ has an output lead extending from the plate terminal of resistor $R_7$ to the blocking oscillator $A_{14}$ which is structurally identical with the oscillator $A_4$; a first input lead extends to the grid of tube $L_3$ from the cathode resistor $R_3$ (Fig. 5) of phase shifter $A_3$, by way of a coupling condenser $C_5$, while a second input lead is connected from the multivibrator $A_{10}$ to the junction of grid resistors $R_8$, $R_9$ via a delay line $A_{17}$. The line $A_{17}$ is so dimensioned as to provide a delay of $(n-1)T$, or 9T, whereby a positive pulse will appear on the grid of tube $L_3$ simultaneously with the generation of each No. 9 pulse $P_1$ by the multivibrator $A_0$. If, at the same time, a phasing pulse is applied to the grid of tube $L_3$ by way of condenser $C_5$, as will be the case whenever a control pulse arrives from circuit $A_5$ at a time when the counting pulses $P_3$ from oscillator $A_4$ register the digit 9 (or $n-1$), a discharge of the tube $L_3$ is brought about in the same manner as has been described for the tube $L_2$, thereby resulting in a steep output pulse from circuit $A_{18}$ which is applied to the timing circuit of oscillator $A_{14}$ and lengthens its recovery period by partially discharging the condensers corresponding to condensers $C_1$, $C_2$ of Fig. 5. Thus the phase of the counting pulses of the tens stage will be advanced by one interval $nT$ with respect to the output $P_2$ of multivibrator $A_{10}$, whereby a decimal carry will be registered in the tens stage whenever the phase of the oscillator $A_4$ in the units stage goes through zero.

An example of the operation of the circuit arrangement of Fig. 2 will now be given. Let us assume that it is desired to perform the operation of adding 28 and 14, result 42. The first step will be to zeroize the system by briefly closing the switches $Z_0$ and $Z_{10}$; this will effectively synchronize the output of each oscillator $A_4$ and $A_{14}$ with that of multivibrator $A_{10}$ and $A_{100}$, respectively, thereby causing the pulses $P_3$ to become aligned with the No. 0 pulses of the train $P_1$ and similarly causing the counting pulses of the tens stage to become aligned with the No. 0 pulses of the train $P_2$. Next the switch $A_1$ is closed eight times, resulting in eight discharges of the phase shifter $A_3$ and causing the output $P_3$ of oscillator $A_4$ to become locked in step with the No. 8 pulses $P_1$ from multivibrator $A_0$. Switch $A_{11}$ is closed twice, resulting in two discharges of the phase shifter $A_{13}$ and causing the output of oscillator $A_{14}$ to fall into step with the No. 2 pulses from multivibrator $A_{10}$. The augend "28" is now registered and can be observed on the readers $A_2$ and $A_{12}$ whose operation will be described hereinafter.

Since the units digit of the addend is "4," switch $A_1$ must now be closed four times. Upon the first closure the pulses $P_3$ will have been locked in on the No. 9 pulses of the train $P_1$; up to this point the phase shifter $A_{18}$ will have remained inoperative inasmuch as no control pulse from circuit $A_5$ has yet occurred with the pulses $P_3$ in their No. 9 time position. When, now, the pulse generator $A_1$ is closed a second time, the control pulse will give rise to a phasing pulse from circuit $A_3$ at the very time when a pulse $P_2$ from multivibrator $A_{10}$ reaches the phase shifter $A_{18}$ through the delay line $A_{17}$, causing this phase shifter to change the tens registration from "2" to "3" at the precise instant the units registration passes from "9" to "0." Two more closures of the switch $A_1$ and a single closure of the switch $A_{11}$, representing the tens digit "1" of the addend, will cause the correct sum "42" to appear on the readers $A_2$ and $A_{12}$. The various steps just described may, of course, also be performed in a different order.

It will be apparent that the number of stages may be increased at will by a simple extension of the principles already disclosed, all stages being substantially identical except for the values of their time constants. It will also be understood that in the case of subtractions, in which the periods of the relaxation oscillators such as $A_4$, $A_{14}$ are shortened instead of lengthened, the carry operation will have to occur whenever the phase of the lower stage passes from the No. 0 to the No. 9 position, this being easily accomplished by eliminating or short-circuiting the delay lines such as $A_{17}$. It may further be noted that means may be provided for selectively suppressing or changing the magnitude of the phase shifting pulse applied to the oscillators by the associated control circuits, such as $A_3$ and $A_{13}$, in order to make the dephasing variable over a range of, for example, from zero to nine pulse periods, whereby multiplications or divisions by reiterative addition or subtraction will be performable in relatively simple manner. If, for example, it is desired to multiply 32 by 3, then the phase shifters $A_3$ and $A_{13}$ may be adjusted to dephase, upon each discharge, the associated oscillators $A_4$ and $A_{14}$ by three and two steps, respectively, in accordance with the units digit and the tens digit of the multiplicand; when, now, the control switches $A_1$ and $A_{11}$ are closed three times (the number of closures corresponding to the magnitude of the multiplier), the result "96" will appear. It will be appreciated that in such cases the carry circuits would also have to be suitably modified, as by connecting the junction of resistors $R_8$ and $R_9$ (via rectifiers, if necessary) to three adjoining taps on the delay network $A_{18}$ sa as to register a carry whenever a subtotal has 7, 8 or 9 as its units digit, i. e. when this units digit is removed from 10 by a number equal to or less than the number of steps (three) by which the phase of the units counter is shifted in response to each signal impuse.

The operation of the reader $A_2$ and, by analogy, of the reader $A_{12}$ will now be described with reference to Figs. 8A and 8B. In its preferred form this reader comprises a cathode ray tube provided with two electron guns producing an upper beam UB and a lower beam LB. Horizontal deflecting electrodes, common to both beams, are energized from a scanning circuit SC which is under the control of multivibrator $A_{10}$ so as to produce one sweep during each pulse period $nT$. The vertical deflecting electrodes for the lower beam LB are connected to the output of multivibrator $A_0$ whereas the vertical deflecting electrodes for the upper beam UB are connected to the output of relaxation oscillator $A_4$. Accordingly, as seen in Fig. 8B, the pulse train $P_1$ appears on the lower part and a pulse $P_3$ appears on the upper part of the screen of the tube $A_2$, the value of the registered digit being thus visually ascertainable from the alignment of pulse $P_3$ with a particular pulse $P_1$ (here the No. 2 pulse). The reader $A_{12}$ may, if desired, be combined with the reader $A_2$ to a single cathode ray tube with four beams.

Figure 9:
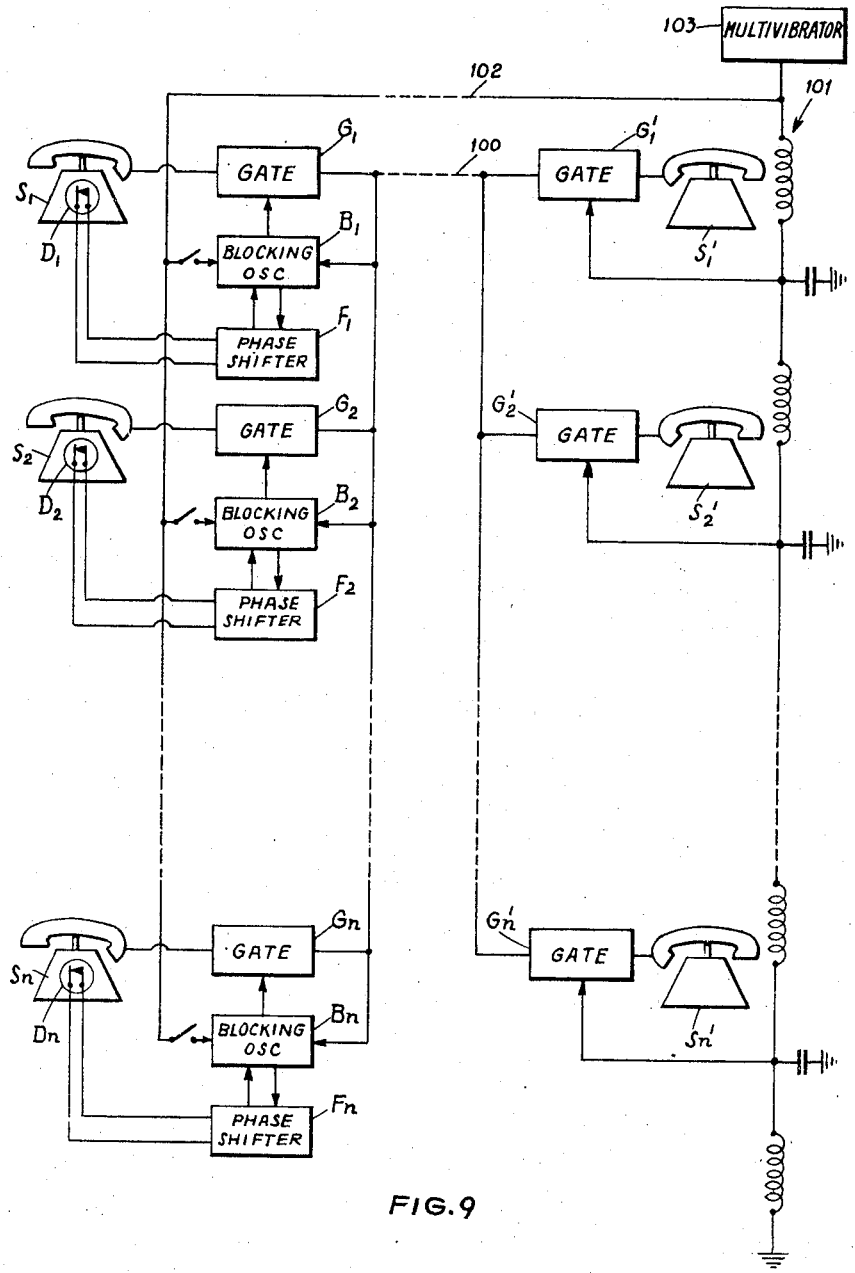
Fig. 9 illustrates, diagrammatically, an automatic telephone switching system incorporating principles of the invention.

In Fig. 9 there is shown a telephone communication system utilizing principles of the present invention. This system comprises a plurality of calling stations $S_1 \ldots S_n$ at one end and a plurality of called stations $S_1' \ldots S_n'$ at the other end of a communication channel 100 (which may be a transmission line, radio link or the like), the number $n$ of stations on either side of the channel being again assumed, in this simplified case, to be of the order of ten. The talking circuit from each station $S_1 \ldots S_n$ and $S_1' \ldots S_n'$ extends to the common channel 100 by way of a normally blocked gate $G_1 \ldots G_n$ and $G_1' \ldots G_n'$, respectively. The gates $G_1' \ldots G_n'$ at the called end of the channel 100 are controlled from a multivibrator 103 applying unblocking pulses to them in staggered relationship through the intermediary of a delay line 101 whose overall delay time is less than the pulse spacing in the output of the source 103, whereby the signal bands from the various called subscribers $S_1' \ldots S_n'$ will be continuously sampled in cyclic succession. The channel 100 thus carries $n$ times as many speech impulses as are produced by the source 103, hence its output will be a pulse train comparable to the train $P_1$ of Fig. 1. A set of blocking oscillators $B_1 \ldots B_n$, respectively connected to the gates $G_1 \ldots G_n$, are adapted to be locked in on different pulses from the channel 100, under the control of respective phase shifters $F_1 \ldots F_n$, in precisely the manner described with reference to phase shifter $A_3$ and oscillator $A_4$ of Figs. 2 and 5.

If a series of control pulses, ranging in number from one to $n$, is applied to any of the phase shifters $F_1 \ldots F_n$, e. g. by means of conventional dials as shown at $D_1 \ldots D_n$, the corresponding blocking oscillator will be locked in on the output from a selected called station and will apply unblocking pulses to the associated gate in step with the unblocking pulses applied to the gate of the selected called station over the line 101. The two subscribers can now converse with each other, it being assumed that the cadence of the pulses from multivibrator 103 is sufficiently high to make the interruptions of the speech waves imperceptible to the listener. The blocking oscillators may be zeroized, i. e. placed in step with the pulses from multivibrator 103 in their original time positions, with the aid of suitable switches over a connection 102 extending from the multivibrator to the various oscillators; it will be understood that these zeroizing switches could be actuated automatically by the calling subscriber upon replacement of his receiver.

Although Fig. 9 shows only one set of stations equipped with selector means according to my invention, it will be apparent that the circuits may be duplicated in reverse to afford the subscribers $S_1'$ etc. selective access to the subscribers $S_1$ etc., it being then merely necessary to provide discriminating relays or the like, responsive in well known manner to initiation of a call from one channel end or the other, for rendering effective either one or the other set of connections. Furthermore, the delay network 101 may be replaced by some different type of distributor, e. g. a stepping switch of the electronic type connected to a pulse generator harmonically related to the multivibrator 103.

The invention is, of course, not limited to the specific embodiments described and illustrated but may be modified in various ways and adapted to other uses without departing from the spirit and scope of the appended claims.

I claim:

1. A pulse-counting system comprising a first pulse generator producing a first train of uniformly spaced pulses, reference means characteristically designating certain of said pulses, thereby dividing said train into successive groups each starting with a pulse so designated and containing a predetermined number of pulses, a second pulse generator producing a second train of pulses having a period of recurrence equal to that of said designated pulses, pulse-producing means, and phase control means controlled by said pulse-producing means and connected to one of said generators for selectively synchronizing each pulse of said second train with a particular pulse in each pulse group of said first train, the time position of said particular pulse within the respective pulse group indicating the number of pulses produced by said pulse-producing means.

2. A system according to claim 1 wherein said reference means comprises a third pulse generator producing a third train of pulses having the same period of recurrence as said second pulse train, said third generator being connected to said first generator with a fixed phase relationship such that each pulse of said third train coincides with a respective pulse of said first train.

3. A pulse-counting system comprising a first pulse generator having a fixed period of recurrence T, a second pulse generator having a normal period of recurrence $nT$, synchronizing means connecting said first generator to said second generator and locking the latter in step with the former, reference means synchronized with said first generator and defining successive groups of $n$ pulses in the output thereof, pulse-producing means, phase-shifting means controlled by said pulse-producing means and connected to said second generator for momentarily modifying the period of recurrence thereof to a value differing by a length of time $qT$ from said normal period $nT$, $q$ being an integer smaller than $n$, thereby enabling the output of said second generator to assume a selected time position with respect to said groups of pulses from said first generator, and reader means controlled by said first and second generators for indicating said time position.

4. A system according to claim 3, further including phase-zeroizing means connected to said first generator for effectively enlarging every $n$th pulse in the output thereof, thereby preferentially locking said second generator in step with said enlarged pulses independently of said phase shifting means.

5. A pulse-counting system adapted to indicate a plurality of digits each capable of assuming $n$ different numerical values, comprising a plurality of stages each representing a respective digit; each of said stages including a fixed-phase pulse generator producing a train of reference pulses of predetermined period of recurrence, a variable-phase pulse generator producing a train of counting pulses having a normal period of recurrence equal to $n$ times said predetermined period, synchronizing means connecting said fixed-phase pulse generator to said variable-phase pulse generator for locking the latter in step with the former, phase-shifting means connected to said variable-phase pulse generator for momentarily modifying the period of recurrence of said counting pulses, phase-zeroizing means connected to said fixed-phase pulse generator for distinctively marking certain periodically recurring ones of said reference pulses having a period of recurrence equal to said normal period, said phase-zeroizing means being operable to lock said variable-phase pulse generator in step with said reference pulses so marked, and pulse producing means actuatable to control said phase-shifting means for selectively locking said variable-phase pulse generator in step with reference pulses other than said marked pulses; said fixed-phase generators of successive stages being connected in cascade, the fixed-phase generator of each succeeding stage having a period of recurrence equal to $n$ times that of the fixed-phase generator of the immediately preceding stage; and reader means controlled by said fixed-phase and variable-phase generators for indicating the instantaneous time position of each train of counting pulses with respect to the associated train of reference pulses, each such time position denoting a respective digit.

6. A system according to claim 5 wherein each of said fixed-phase pulse generators comprises a crystal-controlled multivibrator.

7. A system according to claim 5 wherein each of said generators is adapted to produce pulses having a width of the order of one thousandth of the spacing of the reference pulses of the stage corresponding to the lowest denominational order.

8. A system according to claim 7 wherein said pulses have a width of the order of one microsecond.

9. A system according to claim 5 wherein each of said variable-phase generators comprises a relaxation oscillator having a normal recovery period substantially equal to $n$ times the period of recurrence of the associated fixed-phase pulse generator and adapted to be triggered by pulses from the latter.

10. A system according to claim 9 wherein said relaxation oscillator is provided with a timing circuit determining the said recovery period thereof, said timing circuit including capacitive means and resistance means, said phase-shifting means comprising a source of current impulses so connected to said timing circuit as to alter the state of charge of said capacitive means, thereby varying the time required by said timing circuit for regaining equilibrium after unbalancing by a discharge of said relaxation oscillator.

11. A system according to claim 10 wherein said phase-shifting means is adapted to respond to each actuation of said pulse-producing means by applying to said timing circuit a single current impulse of such polarity and intensity as momentarily to extend the recovery period of said relaxation oscillator by a length of time equal to substantially the $n$th part of its said normal recovery period, thereby advancing the phase of said counting pulses by one period of recurrence of the associated reference pulses.

12. A system according to claim 10 wherein said pulse-producing means comprises a source of random control pulses having a width substantially greater than that of said current impulses, said phase-shifting means being adapted to produce not more than a single current impulse in response to each of said control pulses.

13. A system according to claim 12 wherein said phase-shifting means comprises a normally blocked oscillator having input connections from both said source of random control pulses and said relaxation oscillator, said normally blocked oscillator being adapted to produce a current impulse only upon coincidence of one of said control pulses with a counting pulse from said relaxation oscillator.

14. A system according to claim 5, including carry means extending from a preceding stage to a subsequent stage and phase control means at said subsequent stage connected to said variable-phase pulse generator of the latter stage and controlled by said carry means to vary the period of occurrence of the counting pulses of said latter stage in response to the passage of the counting pulses of said preceding stage through a predetermined time position relative to the associated reference pulses, thereby adapting said system for the performance of arithmetical operations.

15. A system according to claim 14 wherein said carry means comprises a first input lead extending to said phase control means from the fixed-phase generator of said subsequent stage and a second input lead extending to said phase control means from said phase-shifting means of said preceding stage, said phase control means being responsive only to simultaneous arrival of actuating pulses over both of said input leads.

16. A system according to claim 15 wherein said first input lead includes pulse delay means having a delay time equal to an integral number of periods of recurrence of the fixed-phase generator of said preceding stage.

17. A system according to claim 16 wherein said delay time is equal to $n-1$ times said period of recurrence of the fixed-phase generator of said preceding stage.

18. A system according to claim 5 wherein said reader means comprises at least one cathode ray tube having a plurality of beams, scanning means for simultaneously displacing said beams in one dimension, and individual deflecting means for said beams connected, respectively, to said fixed-phase and variable-phase generators for producing images of said reference pulses and counting pulses in relative spatial alignment depending upon their relative time position.

References Cited in the file of this patent

UNITED STATES PATENTS

| | | |
|---|---|---|
| 2,212,420 | Harnett | Aug. 20, 1940 |
| 2,267,827 | Hubbard | Dec. 30, 1941 |
| 2,401,729 | Goldsmith | June 11, 1946 |
| 2,422,204 | Meacham | June 17, 1947 |
| 2,493,517 | Applegarth | Jan. 3, 1950 |
| 2,556,640 | Baker | June 12, 1951 |
| 2,584,987 | Deloraine | Feb. 12, 1952 |
| 2,619,548 | Lesti | Nov. 25, 1952 |
| 2,661,899 | Chromy | Dec. 8, 1953 |
| 2,662,977 | De Rosa | Dec. 15, 1953 |
| 2,665,411 | Frady | Jan. 5, 1954 |
| 2,671,896 | De Rosa | Mar. 9, 1954 |
| 2,706,906 | Rich | Apr. 26, 1955 |
| 2,715,679 | Kleissl | Aug. 16, 1955 |